Fig. 1 (CONVENTIONAL WELL)

Fig. 10 (PRIOR ART)

INVENTOR
CHARLES E. JACOB
BY Henry Shur
ATTORNEY

Aug. 10, 1965  C. E. JACOB  3,199,592
METHOD AND APPARATUS FOR PRODUCING FRESH WATER OR PETROLEUM FROM
UNDERGROUND RESERVOIR FORMATIONS AND TO PREVENT CONING
Original Filed Aug. 26, 1960  4 Sheets-Sheet 2

INVENTOR
CHARLES E. JACOB

BY Henry Shur
ATTORNEY

INVENTOR
CHARLES E. JACOB
BY Henry Shur
ATTORNEY

3,199,592
METHOD AND APPARATUS FOR PRODUCING FRESH WATER OR PETROLEUM FROM UNDERGROUND RESERVOIR FORMATIONS AND TO PREVENT CONING
Charles E. Jacob, 8949 Reseda Blvd., P.O. Box 347, Northridge, Calif.
Continuation of application Ser. No. 52,102, Aug. 26, 1960. This application Sept. 20, 1963, Ser. No. 311,283
29 Claims. (Cl. 166—42)

This invention relates to methods and apparatuses for removing lighter desired liquid from the upper of two adjacent subterranean liquid saturated regions in a subsurface reservoir without mixing and contaminating this liquid with the underlying undesired heavier liquid, and also for preventing "coning" of the underlying heavier liquid into the formation normally containing the lighter desired liquid, even at high rates of production.

This application is a continuation of my copending application Serial No. 52,102, filed August 26, 1960.

Fresh water is often produced from a porous subterranean stratum containing a fresh water saturated layer which overlies a salt water saturated layer. Under static conditions, since the salt water is of greater density than the fresh water, it remains beneath the fresh water due to gravity, with a well defined fresh water-salt water static interface. Petroleum hydrocarbons are often similarly produced from a porous subterranean formation in which oil saturated permeable sands overlie water saturated sands, with a well defined static interface between the oil and water, since the water is of greater density and settles below the oil in the oil producing sands.

Heretofore, the usual practice has been to remove fresh water overlying salt water (or petroleum overlying water) in such a porous subterranean reservoir, by means of a well with perforated casing which incompletely penetrates the porous stratum saturated with the desired lighter liquid and ends some distance above the static interface between the lighter liquid and the undesired heavier liquid. As the well is pumped, or otherwise caused to discharge, the static balance between the lighter and heavier liquids in the porous subterranean reservoir is upset; and the heavier liquid rises in the area adjacent the well, and invades space formerly occupied by the overlying lighter fluid. This phenomenon or mechanism is known as "coning." Eventually, in a conventional well, the contact between the lighter and heavier liquids in the region of the well may progressively cone and rise to reach the bottom of the well at the level of its intake casing perforations. Thereafter, the heavier undesired liquid will appear as a contaminant in the discharge of the desired lighter liquid from the well, in continuously increasing proportions. In some instances, the rate of discharge of a conventional well is reduced to avoid the effect of coning and keep the well in satisfactory operation, especially where the sub-surface reservoir formation is quite permeable, and/or there is a strong drive imposed on the desired liquid (as in a heavy salt water drive oil fields in the Gulf Coast area), making the water coning problem especially serious. However, this solution is not only economically undesirable, but usually merely postpones deleterious coning of the undesired heavier liquid.

Such coning of the undesired underlying heavier liquid produces serious adverse effects, in both water and oil wells.

In producing fresh coastal ground water, an addition of about 1 or 2% of sea water, resulting in 200 to 400 parts per million of the chloride ion, will so contaminate the water that it cannot be used for human drinking purposes. Since there is no commercially satisfactory way for removing an excess of chloride ion from the water, coning of underlying salt water can rapidly ruin a fresh water well, unless it is controlled. A factor which makes the coning problem especially acute in a fresh water well, and makes effective prevention and control thereof especially necessary, is that generally some pump means is required in the well to lift the fresh water from the subterranean reservoir because of lack of natural drive, such as often found in oil wells; and operation of the pump relatively near the fresh water-salt water static interface especially alters the pressure gradients, thus inducing coning of the salt water towards the well intake.

In an oil well, the coning of underlying water results in the pumping of a substantial quantity of water to the surface along with the produced oil, thereby increasing the production cost of each barrel of oil, because of the cost of pumping to the surface and disposing of valueless water. Moreover, substantial additional costs may be incurred if the oil and water emulsify in the well, as frequently happens, since the desired oil must be separated from the emulsion at the surface, which usually requires expensive equipment and chemical treatment. Further, an even more serious result is that the coning of water into the producing area of the oil well often completely shuts off the flow of the oil itself; and it is frequently difficult to treat such an oil well because the normally oil-wet or nearly oil saturated sand grains ordinarily constituting the oil producing formation have become water-wet or more highly water saturated in the region surrounding the well.

Accordingly, there have been many prior attempts (including efforts by leading United States oil companies) to provide effective methods and means for removing water block due to coning in oil wells, and especially for preventing deleterious coning of the underlying water during the production of the overlying oil. (Most known prior anti-coning efforts are in the field of petroleum production, to prevent water encroachment in oil wells, which, however, do not present as serious and difficult a problem as coning in fresh water wells.) For example, in one method, the well bore of an oil well is undercut adjacent the static interface between the oil and water, and cement injected into the porous stratum in this region to prevent water coning. In another similar method, packers are set in the well borehole near the interface between the oil and water, and an impervious sealing material injected between the packers through a tubing and forced out under pressure to form a plug in the formation near the top of the water layer. Other methods involve: (a) the cycling of gases, with or without vaporized halosilanes, to form hydrophobic films for reducing the water permeability of the sands adjacent the well intake where coning might occur; (b) injecting a silicone polymer dissolved in heated oil in the area where water coning might occur in an oil well; (c) shutting off the well when coning occurs, and depressing the water cone with oil introduced into the well to form an emulsion in the formation intended to impede transfer of water into the oil well; and (d) forcing the water cone down with a lighter liquid, controlling back pressure to restrain the water from coning around the well, and producing the well at a rate correlated to the back pressure maintained. Such methods are only temporarily successful. Upon further exploitation of the overlying oil following treatment, the underlying water will again rise and cone around the well intake, contaminating the oil raised to the surface, and ultimately even render the well unusable, with such deleterious coning merely being delayed for a greater or lesser time, depending upon relevant well factors and the effectiveness of the particular method used.

Hence, systems have been proposed for attempting to more or less continuously prevent coning of the underlying water in an oil well by packing off the bottom of the well bore, pumping the lighter oil from the oil stratum into the well above the packer, segregating the oil into two portions, passing the larger of said portions upwards to the surface, and passing the smaller of said oil portions downward towards the underlying water by means of a tube extending through the packer. In one such system, the packer is appreciably above the oil-water interface, and the smaller oil portion is directed towards the interface for the purpose of depressing the underlying water. In another such system, the packer is located at the oil-water static interface, and the smaller oil portion is circulated into the water layer for the purpose of diverting the water away from the well intake. However, in such systems, the recirculated portion of the lighter liquid picks up more and more of the heavier liquid by diffusion and/or dispersion. And, since this recirculated portion of lighter liquid is free to mix above the packer with the rest of the lighter liquid taken into the well bore, there is a zone of turbulent mixing in the region of the well pump with further resultant diffusion and dispersion of the contaminated recirculated lighter liquid into the lighter liquid raised to the surface, whereby the well product is contaminated with the undesired heavier liquid. These characteristic shortcomings of such anti-coning systems are especially disadvantageous in a water well, because such diffusion and dispersion of the heavier salt water into the lighter fresh water pumped to the surface will relatively quickly raise the chloride ion content to more than 250 parts per million, which is the upper limit for public water supply according to U.S. Public Health Service standards, rendering it unsatisfactory for human taste. These shortcomings are also serious in an oil well, since such dispersion and mixing of the underlying water into the oil raised to the surface will ultimately result in raising an excessive quantity of valueless water and/or emulsified oil and water, thereby increasing the cost of production substantially. Another disadvantage of known prior anti-coning systems of this kind for fresh water and oil wells is that they do not contemplate or provide for effective economical field adjustment of the proportion of lighter liquid segregated in the well and recirculated to the underlying heavier liquid, wherefore such a system adopted for a given well set-up is relatively inflexible and does not lend itself to readily meeting changing conditions as the well is pumped over a period of time.

It is a principal objective of the present invention to provide new improved methods and apparatuses for achieving the recovery of uncontaminated desired lighter liquid overlying a heavier liquid in subterranean reservoir, by hydraulically preventing the undesired heavier liquid from coning and entering into the well; and more especially by utilizing a novel improved arrangement for continuously pumping a portion of the overlying lighter liquid towards the underlying heavier liquid to depress the static interface, and recirculating this portion of lighter liquid between the static interface and a point below the well intake of the lighter liquid raised to the surface.

It is a related object of the present invention to provide new improved methods and apparatuses for thus circulating a portion of lighter liquid in a "closed cell" established between the normal static interface and the aforesaid point below the well intake for the lighter fluid raised to the surface, with a fluid streamline boundary separating the thus-circulated lighter liquid within the "closed cell" from the lighter liquid passing into the well and raised to the surface, thereby virtually eliminating transfer across the streamline boundary of undesired heavier fluid which may have diffused or dispersed into the lighter liquid of the "closed cell" from its contact with the heavier liquid, whereby the desired lighter liquid produced by the well is virtually uncontaminated.

It is still another related object of this invention to achieve such a "closed cell" arrangement, with isolation of the recirculated portion of the lighter liquid from the lighter liquid produced by the well, through novel use of a pair of spaced conventional packers dividing the well bore into a plurality of chambers, with one of the chambers housing the means for recirculating the lighter liquid of the "closed cell," whereby one of the packers establishes the locus of the above-stated boundary streamlines which isolate the desired lighter liquid produced by the well from the undesired heavier liquid.

It is another principal object of the present invention to provide such new improved methods and apparatuses for removing uncontaminated desired lighter liquid overlying a heavier undesirable liquid in a subterranean reservoir, which are so efficient in segregating the desired lighter liquid pumped to the surface, that the method and apparatus of this invention can be used to pump fresh water overlying salt water and keep contamination (if any) below 250 parts per million of chloride ion, and prolong useful life of the well, even in coastal areas where there is strong salt water drive. It is another related object to provide such new, improved efficient well methods and apparatuses which, a priori, are useful in oil wells to prevent water coning and virtually eliminate water contamination and/or emulsification of the oil produced, even where there is heavy salt water drive, thereby greatly reducing the cost of production per unit of oil, and eliminating or minimizing substantial problems of well maintenance in a formation where water coning is likely.

It is another related object of this invention to provide new improved methods and apparatuses for removing the lighter desired liquid from a subterranean reservoir without mixing it with the underlying heavier liquid, and to prevent coning of the undesired heavier liquid around the well, which will permit a greater rate of production of uncontaminated lighter liquid than would otherwise be possible.

It is still another object of the present invention to provide various improved apparatuses to accomplish the foregoing objects and advantages, with some apparatuses being particularly suitable for certain well conditions.

It is another object of the present invention to provide such a new improved method utilizing apparatus that is competitive cost-wise with apparatuses for prior, but less efficient, methods of producing lighter liquid from wells in formations where coning and encroachment of undesired heavier liquid is likely.

Other objects and advantages of the present invention, and how they are achieved, will be apparent from the following description with reference to the accompanying drawings, wherein.

The method and apparatuses of the present invention will now be more particularly described. It is noted at the outset, however, that, for clarity and to avoid unnecessary repetition of description, like components of different embodiments in the drawings are identified by like numerals, and corresponding components of different embodiments are identified by like numerals with different subscript letters.

Figure 1:
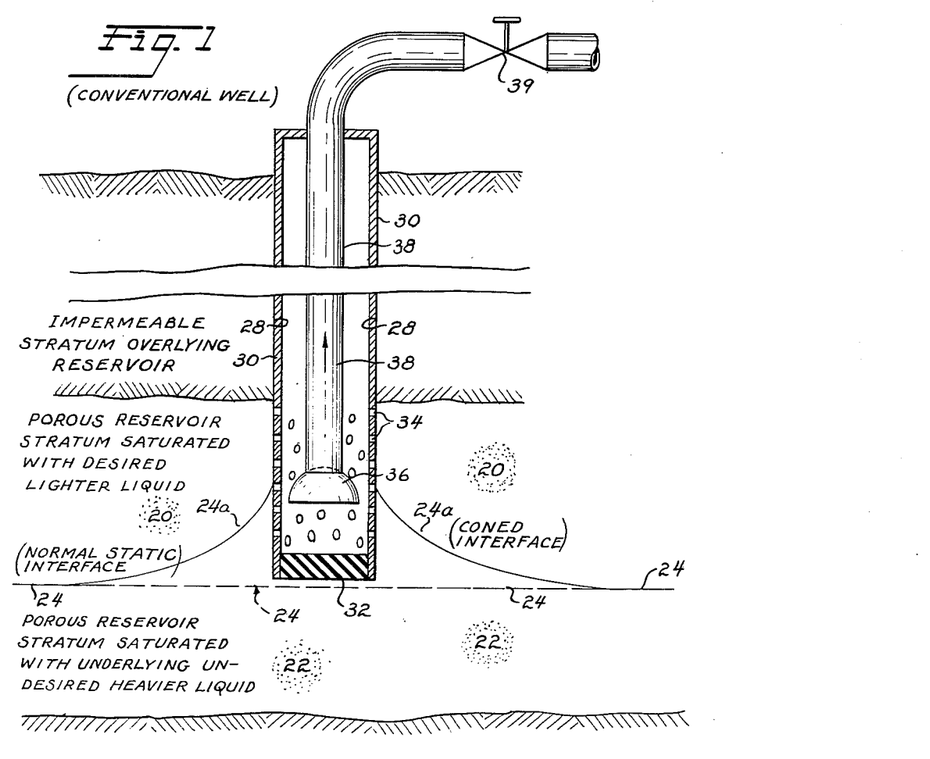
FIGURE 1 shows a diagrammatical vertical cross-section of a conventional oil well in a subterranean reservoir, wherein coning of the undesired heavier liquid has developed adjacent the well pump intake in the layer of porous stratum normally saturated with the desired lighter liquid (fresh water or oil)

Referring now to FIGURE 1 of the drawings, this schematically illustrates a conventional well and the phenomenon of coning of the underlying undesired heavier liquid in a subterranean reservoir from which overlying lighter desired liquid is drawn. The region of the porous stratum saturated with the layer of desired lighter liquid, such as oil or fresh water, is generally indicated by the numeral 20 which is surrounded by dots indicating the permeable sand or other rock of this part of the reservoir formation. The immediately underlying region of the porous stratum saturated with the layer of undesired heavier liquid (water in an oil well; salt water in a fresh water well) is indicated by the numeral 22, which is surrounded by dots schematically representing the permeable sand or other rock of this part of the reservoir formation. Prior to the drilling of a well into the formation, there is a more or less well defined normal static interface 24 between the lighter and heavier liquids in the porous reservoir formation, since these liquids have been segregated by gravity into their respective zones due to their different densities. A well bore 28 is drilled by known techniques through the impermeable strata into the upper lighter liquid producing formation 20, to a point which is slightly above, or sometimes approximately at, the static interface 24 (the top of the heavier liquid layer 22), and a production casing 30 is provided within this well bore 28. The bottom of the well casing 30 is usually cemented, or provided with a packing, indicated by numeral 32, to close off the bottom of casing 30 above the static interface 24 (indicated in broken line adjacent the well). The well casing 30 is provided with perforations 34 above the packing 32 and within the formation 20, through which the desired lighter liquid is drawn into the well and raised to the surface by any of various means. For illustrative purposes, there is diagrammatically shown, in the lower part of casing 30, a pump 36 whose flat lower end is the input end, and whose semi-circular upper end is the output end. The output end of pump 36 is connected to tubing 38, through which the desired lighter liquid is raised to the surface; and the rate of production can be controlled at the surface by a valve 39 in piping 38, if desired. When the desired lighter liquid is produced from sands 20, the upward directed hydraulic gradient associated with the flow of the lighter liquid into the well and to the surface causes the interface between the lighter and heavier fluids to rise in the region adjacent the well, by the above-explained coning phenomenon, as indicated by lines 24a (exaggerated). The rise of coning interface 24a between the lighter and heavier liquids adjacent the well will progress until the apex of the cone reaches the well casing perforations 34. Thereafter, the lighter fluid produced by the well from region 20 will be contaminated by the undesired heavier liquid raised by the well in progressively increasing amounts along with the desired lighter liquid, with the deleterious and objectionable effects previously discussed, and ultimately rendering the well usuable without effective cone removal treatment.

Figure 2:
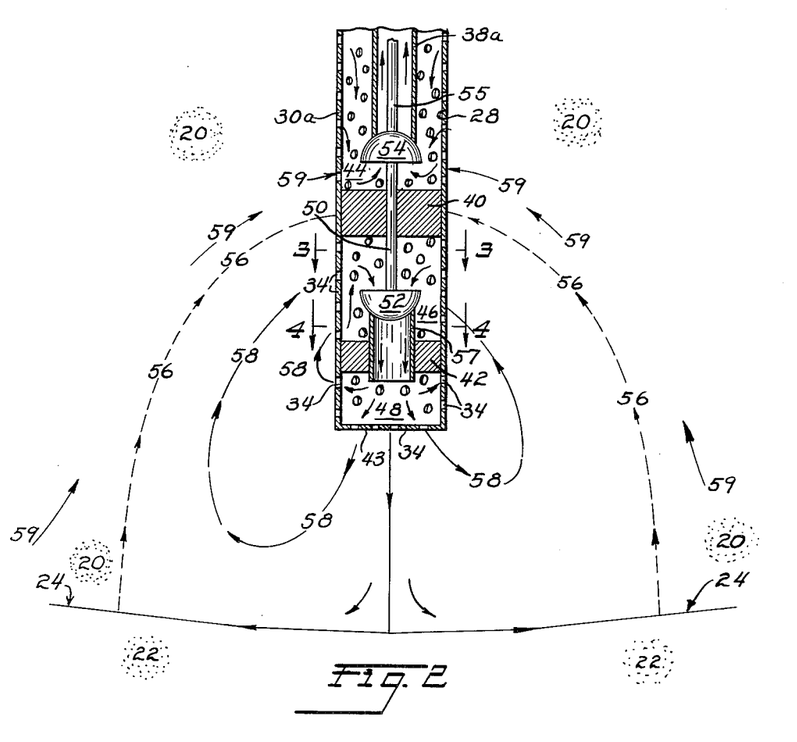
FIGURE 2 shows a diagrammatical vertical cross-section of a preferred means for carrying out the new improved "closed cell" anti-coning method of this invention to produce the desired upper liquid uncontaminated by the heavier undesired liquid, illustrating the involved flow pattern, including two opposed closely connected pumps near the circulating closed cell.
Figure 3:
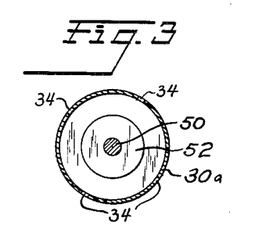
FIGURE 3 is a horizontal cross-section along line 3—3 of FIGURE 2, looking in the direction of the arrows.
Figure 4:
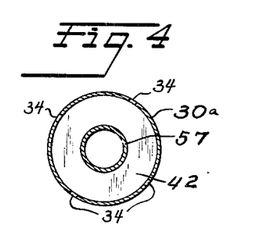
FIGURE 4 is a horizontal cross-section along the line 4—4 in FIGURE 2, looking in the direction of the arrows.

Referring to FIGURE 2, this schematically illustrates my new improved method and a suitable means for preventing or reducing coning of the undesired heavier liquid and removing the desired lighter liquid uncontaminated with the undesired heavier liquid. A well 28 with circular casing 30a having perforations 34 is provided by suitable current techniques in upper porous reservoir layer 20, which is saturated by the desired lighter liqud (oil or fresh water). The depth of well 28 and length of casing 30a are determined by the depth of the porous stratum 20, by the position of the normal contact or static interface 24 between the two liquids before exploitation of the desired lighter liquid from producing region 20, and by size of the well chambers and capacity of the well pumps. The static interface 24, is located in the field prior to the completion of an oil well through electric logging, drill-stem, or other tests to determine the locus of the oil-water static interface 24. For a water well, the fresh water-salt water interface 24 can be located by running a salinity profile using a conductivity cell and bridge circuit.

The well apparatus of this embodiment comprises a pair of spaced upper and lower packers 40 and 42, which define in well casing 30a upper, middle and lower chambers 44 and 46 and 48, respectively, these chambers being separated by the impervious packers. It is noted that the packing means 40 and 42 for partitioning the well into chambers are not per se a part of the present invention. Suitable well packings are presently commercially available; e.g., from several oil field supply houses. Hence, these packings 40 and 42 are merely diagrammatically shown in cross-section in the drawings.

A common power channel for a lower pump 52 and upper pump 54 is schematically illustrated at 50 and passes through the upper packer 40 with suitable sealing. The pumps 52 and 54 are also illustrated schematically, with the semi-circular pump end being the output end, and the flat pump end being the input end. The output end of the lower pump 52 in middle chamber 46 is connected to lower packing 42 by suitable piping 57; and the output end of the upper pump 54 in upper chamber 44 is connected to suitable piping 38a, through which the desired lighter liquid is raised to the surface. A suitable power input means for upper pump 54 (and for pump 52 through power channel 50) is schematically indicated at 55.

Any of various suitable types of pumps 52 and 54 may be used. For example: (A) The pumps 52 and 54 may be reciprocating plunger pumps, in which case the common power channel 50 and power input means 55 would be suitably connected reciprocating pump rods. (B) The pumps 52 and 54 may be hydraulic cylinder pumps, in which case the common power channel 50 and power input means 55 would be hydraulic power tubing. (C) The pumps 52 and 54 may be turbine pumps with power input means 55 being an elongated shaft rotated by an external prime mover, in which case the common power channel 50 is a rotatable shaft connecting the two turbine pumps 52 and 54. (D) The pumps 52 and 54 may be turbine pumps driven by an adjoining submersible electric motor, in which case the common power channel 50 and power input means 55 would be electric power cable.

It is possible for two different type pumps 52 and 54 to be used, with different appropriate power channels for each of them. Or, pumps 52 and 54 may be of like kind, with separate power channels. However, it is usually preferable to match the pump 52 in chamber 46 with the pump 54 in chamber 44 so that they may share a common power channel 50 and common power input means 55.

The pumps 52 and 54 are simultaneously operated to produce a flow of liquid into and through the three separated upper, middle and lower well chambers 44, 46 and 48, as depicted by arrows in FIGURE 2, and as will now be amplified. The lighter liquid of porous sand layer 20 is drawn into the well casing 30a through the perforations 34, with lower pump 52 drawing such liquid into the middle chamber 46 between packings 40 and 42, and passing it through piping 57 and lower packing 42 into the lower well chamber 48. This liquid leaves the lower chamber 48 through the lower chamber perforations 34 and passes into the surrounding region of porous stratum 20, downwardly towards the interface 24. After a length of time, depending upon such relevant factors as the distance of the lower packing 42 from the static interface 24, the rate of discharge of pump 52, and the size of intermediate chamber 46, there is formed a "closed cell" of steadily circulating lighter liquid. This "closed cell" is bounded by (a) the interface 24 (which may be slightly depressed from its normally horizontal static location in the region below the well 28), and (b) the limiting streamlines 56 indicated by the dashed lines and arrows. Within this closed cell, the lighter liquid flows in streamline fashion as illustrated by the representative streamlines 58. [It is noted that oil well and water well casings are usually plugged in the bottom, and that such plugs are rarely perforated. However, the bottom plug 43 in FIGURE 2 is shown perforated to permit consistency in the flow line pattern in the distorted scale drawings which must be used.]

Due to the action of the upper pump 54, the desired lighter liquid in stratum 20 above and outside of this circulating "closed cell" is drawn radially, and somewhat upwardly, to and through the perforations 34 in casing 30a surrounding the upper well chamber 44, above the upper packing 40, as shown by the typical streamlines 59. This portion of the lighter liquid passes through pump 54 and piping 38a to the surface. The upper packing 40 which divides well chambers 44 and 46 definitely establishes the upper location of the streamlines 56 bounding the circulating "closed cell." And, the boundary streamlines 56 prevent dispersion and/or diffusion and/or crossing over from the circulating "closed cell" to the lighter liquid taken into upper well chamber 44 and raised to the surface. Thus, any of the undesired heavier liquid that enters into the closed cell from lower layer 22 at the interface 24 is effectively prevented from passing into the lighter fluid in stratum 20 outside this "closed cell." Hence, entry of contaminating heavier fluid from lower stratum 22 into the upper well chamber 44 and lifting pump 54 can be virtually eliminated by careful control of the "closed cell." Thus, the well can produce the desired lighter liquid with radical reduction of contamination compared to prior well systems.

The ability to virtually eliminate entry of the undesired heavier fluid into the lighter fluid raised to the surface through the producing well chamber is especially important in fresh water wells since dispersion and/or diffusion of as little as 250 parts per million of the chloride ion into the fresh water lifted to the surface may contaminate the water so that it is not satisfactory for human drinking. In coastal areas, it is difficult to raise sufficiently pure and uncontaminated water from a well having the strong underlying salt water drive found in such areas; but this can be done with the above-described method and apparatus of this invention which establishes such bounding streamlines that prevent contamination. Hence, the present invention can render useful a water well which may otherwise be unusable in view of the practical impossibility of economically removing excess chloride ion from the water produced by the well (whereas it is possible, although additionally expensive, to remove water mixed with the oil in the case of an oil well).

Further, the pumping of lighter fluid towards the static interface 24 to establish this circulating "closed cell" depresses the interface and thus serves to continuously prevent coning of the underlaying heavier liquid, which would otherwise cone and contaminate the well product in the absence of such arrangement.

Generally, the lower pump 52 will circulate in the "closed cell" up to approximately 10% of the volume of lighter liquid pumped by the upper pump 54.

The particular pairing arrangement of well pumps 52 and 54 is not per se an essential feature of the present invention, providing a suitable pumping arrangement such as herein disclosed is utilized. The above-described embodiment of FIGURE 2, in which the two pumps 52 and 54 are closely connected, with the upper pump 54 immediately above packing 40 and near the bottom of upper chamber 44, is especially contemplated for relatively shallow well installations, particularly when using turbine pumps with and externally driven power input shaft 55 and common power channel shaft 50.

Figure 5:
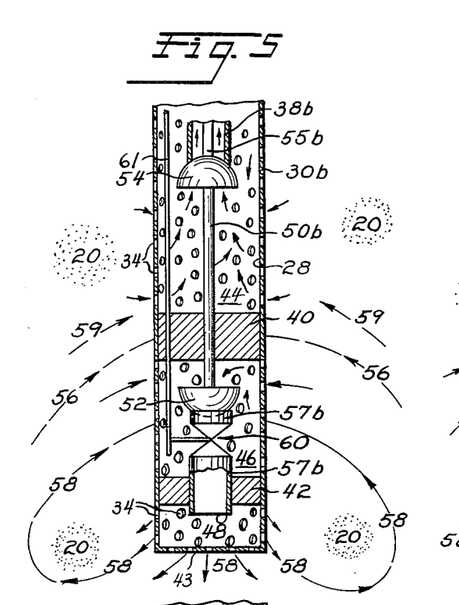
FIGURE 5 is a vertical cross-section of an apparatus for practising my new improved anti-coning method for producing uncontaminating lighter liquid, in which the two pumps are opposed and widely separated, the upper pump being a substantial distance from the circulating "closed cell"

Referring to FIGURE 5, there is disclosed another suitable well system for practicing the new improved method of this invention, as described in connection with FIGURE 2. This well apparatus is similar to the embodiment of FIGURE 2, but the upper pump 54 is at a substantial distance from the upper packing 40 and lower pump 52 located in intermediate chamber 46. This apparatus is contemplated for a deep well installation, especially when utilizing submersible motor driven turbine pumps 52 and 54, with electric cable for common power channel 50b, and power input means 55b. It will be noted that in the FIGURE 5 embodiment, a throttling valve 60 is shown in the piping 57b which connects the outlet of lower pump 52 to the lower packing 42; such a throttling valve 60 may be included in any of the well arrangements of this invention, if desired (as shown for illustrative purposes in FIGURE 5). It may sometimes be desirable to change the volume of lighter liquid circulating in the "closed cell" compared to the volume of lighter liquid raised by pump 54 as conditions in the well may change, and this can readily be done by using throttling valve 60 to control the volume of lighter liquid through lower pump 52 and lower well chamber 48. Suitable valves such as indicated at 60 are available in the industry, with various mechanical, hydraulic, or electrically actuated solenoid means for controlling them from the surface, such means being shown schematically at 61. A throttling valve can additionally or alternatively be placed in eduction pipe 38b at the surface, to govern the well operation by controlling the rate of production of the desired lighter fluid from the well. However, throttling of lower pump 52 by a valve 60 in pipe 57b is preferable for such control purposes, since throttling of eduction pipe 38b may unnecessarily cut the rate of well production of the desired lighter liquid.

The practical significance of the differences between the embodiments of FIGURES 2 and 5 is largely a matter of convenience, as the spacing of the pumps 52 and 54 has little or no effect on the efficiency of the above-described "closed cell" method of the present invention, for preventing coning of the heavier liquid and contamination of the lighter fluid raised to the surface by the upper pump 54. This is also true with respect to spacing of the pumps in the embodiments of FIGURES 6 and 7 hereinafter described.

Refrring to FIGURE 6, there is shown another suitable apparatus for practicing the new improved method of this invention, as described in connection with FIGURE 2. In this apparatus, the lower and upper pumps 52 and 54 are opposed with a short common power channel 50c. Both pumps are located a substantial distance above the bottom of the upper chamber 44. As is apparent from the drawings, pipe 57c connects the outlet of the lower pump 52 with the lower packing 42 so that lighter fluid passes from pump 52 through the lower chamber 48. A concentric pipe 63 is connected between the inlet of lower pump 52 and the upper packing 40, so that the lighter fluid for the closed cell is taken into the intermediate chamber 46 between packings 40 and 42, and thence through the annular passage between the pipes 57c and 63 into the inlet of lower pump 52, which pumps it down through pipe 57c and lower packing 42 into the lower well chamber 48 to establish the circulating "closed cell," which prevents coning of the heavier liquid and prevents contamination of the lighter liquid raised to the surface by upper pump 54 through piping 38c.

Figure 6:
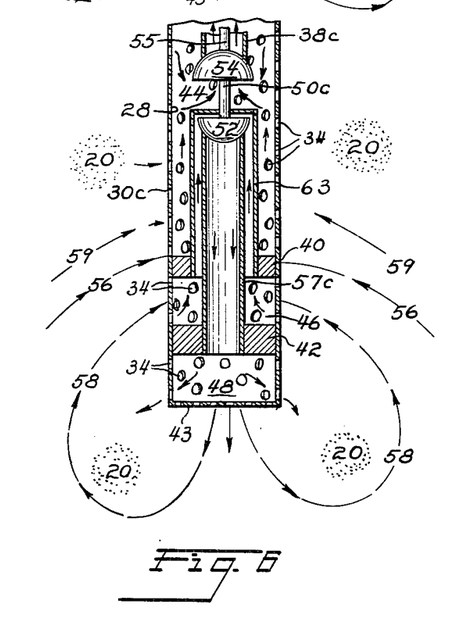
FIGURE 6 is a vertical cross-section of another well apparatus for practising the new improved method of this invention, in which two opposed pumps are closely connected, but are located some distance above the circulating "closed cell"
Figure 7:
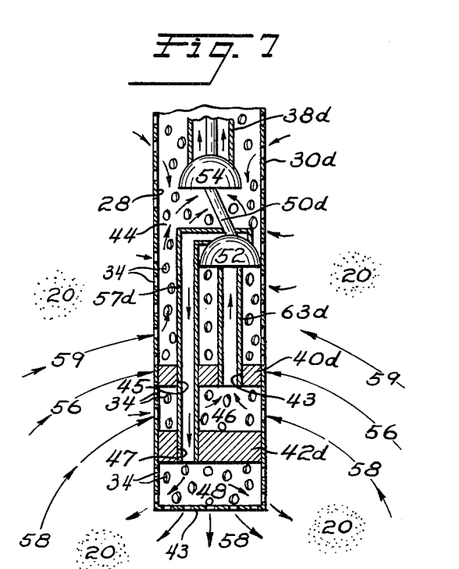
FIGURE 7 is a vertical cross-section of another well apparatus for practising the new improved method of this invention, in which the two pumps are closely connected in tandem, and positioned some distance from the circulating "closed cell"

In addition to the pumps 52 and 54 being paired in opposed relation, as in above-described embodiments of FIGURE 2, 5 and 6, they may be paired in tandem as shown in FIGURE 7, which illustrates another suitable well apparatus for carrying out the new improved method of the present invention, as described in connection with FIGURE 2.

Referring to FIGURE 7, in this embodiment the pumps 52 and 54, connected by a common power channel 50d, are arranged in tandem and located at a substantial distance from the lower packing 42d, which separates intermediate and lower well chambers 46 and 48d. The upper packing, which separates upper and intermediate well chambers 44 and 46, is provided with two circular apertures 43 and 45; and packing aperture 43 is connected to the inlet of lower pump 52 by pipe 63d. The outlet of lower pump 52 is connected by suitable cross-over piping 57d to the aperture 45 in the upper packing 40d and to an aligned aperture 47 in the lower packing 42d, so that the pump outlet communicates with lower well chamber 48. Hence, the lighter fluid for the closed cell is drawn by lower pump 52 through the perforations 34 of casing 30d located between the packings 40d and 42d, and thence through pipe 63d into the inlet of lower pump 52, which pumps it through piping 57d to the lower chamber 48 to establish the "closed cll" which prevents coning and contamination of the lighter liquid being raised to the surface by upper pump 54 through connected pipe 38d.

The embodiments of FIGURES 6 and 7 are especially designed for deep installations. The embodiment of FIGURE 6 provides a somewhat more efficient use of the cross-sectional area of the well casing; whereas the embodiment of FIGURE 7 would normally be easier to install and/or remove for service.

Figure 8:
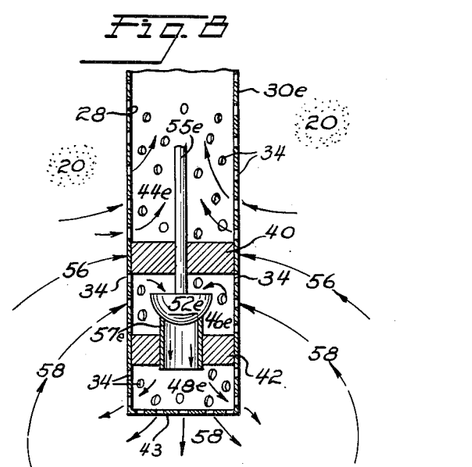
FIGURE 8 is a vertical cross-section of apparatus for practising my new improved anti-coning method for producing uncontaminated lighter liquid in an oil well wherein the oil flows to the surface due to natural pressure in the subterranean reservoir.

In some instances, the natural energy of the liquid filling the subterranean reservoir may cause the desired lighter liquid in upper porous reservoir zone 20 to flow into the well and to the surface, without the need of an upper pump such as 54 (for example, in a gas capped oil well, or in a well using an air or gas lift device in lieu of a lifting pump). In that event, the new improved method of this invention for preventing coning of the lower heavier liquid and producing uncontaminated desired lighter liquid from the well can be practised with a well apparatus as illustrated in FIGURE 8. The upper pump (54) for lifting the desired lighter liquid to the surface is omitted, and only a single pump 52e is provided, with associated packings 40 and 42, piping 57, and power input means 55e to establish the above-described "closed cell" wherein oil from the upper reservoir layer 20 is recirculated through perforations 34 surrounding the lower well chambers 46e and 48e against the oil-water interface (24) to prevent it from coning and to create the streamlines 56 which prevent water contamination of the oil being produced in the perforated upper chamber 44e of well casing 30e, under natural pressure from the petroleum producing stratum. However, in wells for producing fresh water from a reservoir stratum overlying salt water, there is generaly insufficient natural energy to raise the desired fresh water, and a dual pump well arrangement, such as shown in one of FIGURES 2, 5, 6 and 7, would generally be required to effectively practice the new improved method of this invention.

The well apparatuses such as disclosed in FIGURES 2, 5, 6, 7 and 8 of the present invention are installed by techniques known in the art. For example, referring to the embodiment of FIGURE 2, after the well casing 30a has been installed, the lower packing 42, piping 57 (and throttling valve 60, if included), lower pump 52, power channel 50, upper packing 40, upper pump 54, and the first section of eduction piping 38a would be assembled, with the packers 42 and 40 retracted, and lowered into the casing 30a.

Then the eduction pipe column 38a would be made up a joint at a time and lowered step by step into the well until the lower packer 42 reaches the desired position in the reservoir, which can be calculated after determining the locus of static interference 24 and the depth and thickness of upper porous liquid layer 20 by known means. The packers 40 and 42 would then be expanded and set from the surface by the means provided on commercially available packers. Thereafter, the piping arrangement is completed at the surface to conduct the fluid from the piping 38a to the desired point of storage or discharge. With an "elongated" well apparatus (e.g., as in FIGURES 5, 6 and 7), the retracted packings 40 and 42, pumps 52 and 54, related piping, and common power channel and power input means, can be progressively assembled and lowered into the well casing, by techniques known in the art, until the packers are at the desired level in the well and then expanded from the surface to set the well apparatus in place.

It will be noted that the well apparatus of this invention, shown in FIGURES 2, 5, 6, 7 and 8, is movable as an assembly within the well casing, by retracting the packers 40 and 42 and raising or lowering the eduction piping [or the power input means 55e, or pump supporting piping (not shown) for the FIGURE 8 embodiment]. This feature gives flexibility to the apparatus, enabling more effective practice in the field of the above-described new improved anti-coning, anti-contamination "closed cell" method of this invention, since the well apparatus can be readily and economically raised (or lowered) and reset from the surface, especially as the lower heavier undesired fluid ultimately rises and invades a part of reservoir layer 20 formerly occupied by the desired lighter liquid.

My new improved anti-coning, anti-contamination methods and apparatuses may be used in fresh water wells as much as 3,000 feet deep, and in oil wells as much as 5,000 to even 15,000 feet deep. As previously indicated, the relative spacing of the pumps 52 and 54 in the well is largely a matter of convenient arrangement and ordinarily will have little or no effect on the efficiency of my new improved well systems. The size of the well chambers (casing may vary from 5 to 24 inches or more in diameter, and length may vary), and the respective capacities of pumps 52 and 54 do in part determine the proper location of the lower packing 42 with respect to the static interface 24, as previously pointed out. By way of example, depending on the thickness of the porous reservoir region saturated with lighter liquid: the position of the lower packing 42 may be from about 5 to 50 feet above the static interface 24, and the lower well chamber 48 may be from a few to about 50 feet in length; the upper packing 40 may be spaced from the lower packing 42 between 10 to 100 feet; and upper pump 54 may be spaced from upper packer 40 as much as 100 feet.

The depth of the well bore and casing, location of the lower packing 42 with respect to the static interface 24, and length of chambers 44, 46 and 48 (and thus location of the two packers 42 and 44) can be pre-determined for a particular well in accordance with various relevant factors, as discussed above.

The new improved "closed cell" anti-coning and anti-contamination method of the present invention, and the various above-described means for carrying out this method, can be employed in an oil well where coning has occurred, after the well has been cleaned and redeveloped by any of several techniques known in the art. In the case of a water well, however, extreme care must be taken not to disturb the underlying body of salt water any more than necessary. After the well is cleaned and redeveloped by such known techniques, the interface between the overlying desired lighter liquid and the underlying undesired heavier liquid is determined by known techniques. For example, in such a redeveloped water well, conductivity profiles are run under various rates of production to determine the interface. The interface having been found, the approximate height of the lower packer 42 can be calculated; and the well apparatus of this invention is then installed as previously described.

In addition to the throttling valve means discussed above in connection with FIGURE 5, the well systems of this invention shown in FIGURES 2, 5, 6 and 7 could be throttled by various alternative means to adjust the amount of lighter liquid circulated in the "closed cell" by pump 52 in relation to the amount of lighter liquid lifted to the surface by pump 54. For example: (a) by appropriately selecting the sizes of pumps 52 and 54 if they are driven at the same speed, as in the case of turbine pumps; or (b) by driving the two pumps at different speeds if they are submersible electric motor pumps, having individual motors; or (c) by using different diameter plungers in the case of a reciprocating pump; or (d) to some extent, by adjustment of the distances between the packers 40 and 42 for given size pumps 52 and 54. However, such methods are relatively inflexible and the use of a throttling valve for lower pump 52, such as shown at 60 in FIGURE 5, is preferable for all embodiments of FIGURES 2, 5, 6 and 7. Referring to the embodiment of FIGURE 8, it is also preferable to use a throttling valve (such as shown at 60 in FIGURE 5) in pipe 57e connecting the lower pump 52e and the lower packer 42 to control the relative volume of lighter liquid circulated in the "closed cell" compared to the volume of lighter fluid raised to the surface by natural pressure.

Figure 9:
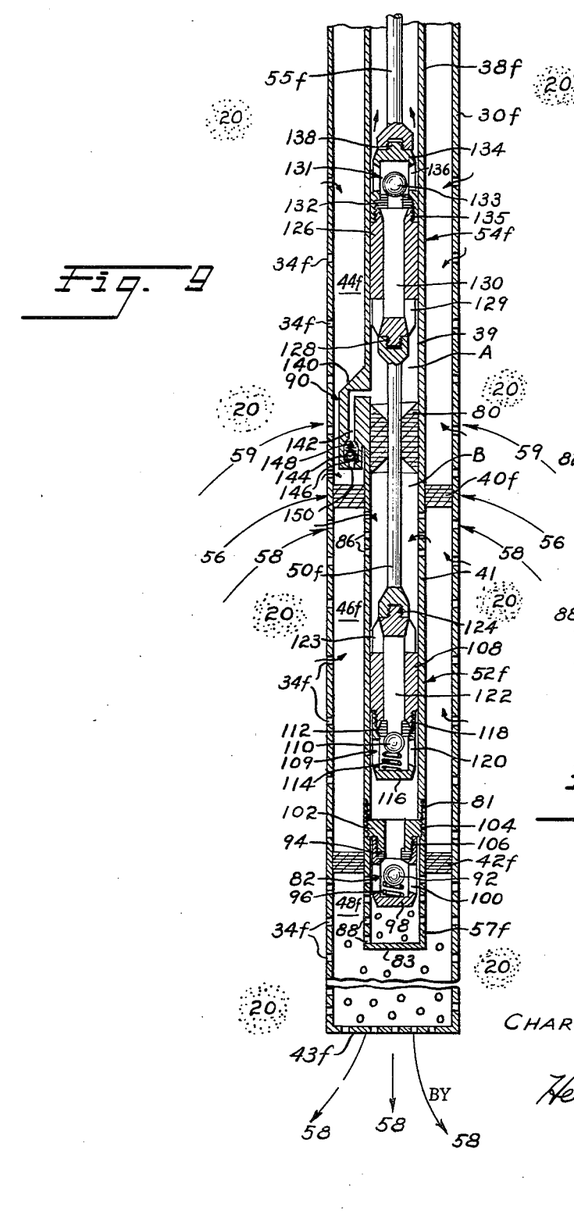
FIGURE 9 shows a partly diagrammatic vertical cross-section of a specific well apparatus including inverted and opposed coupled reciprocating plunger pumps for simultaneously lifting the desired lighter subterranean liquid to the surface, while reinjecting a portion thereof from the well into the subterranean reservoir to carry out the new improved "closed cell" anti-coning method of this invention.

Referring to FIGURE 9, there is shown a specific well apparatus for carrying out the new improved "closed cell" anti-coning method of this invention. More especially, this apparatus comprises a well system including inverted and opposed coupled reciprocating plunger pumps for circulating a portion of lighter liquid in the "closed cell" within the upper porous stratum above the static interface 24 (not shown in this figure), while raising most of the lighter liquid in the well to the surface. To the extent feasible, components of the well apparatus of FIGURE 9 corresponding to those in the above-described FIGURE 2 are identified with like numerals as in FIGURE 2 plus the subscript $f$, for clarity and to minimize duplicate discussion. It is also noted that the drawing of FIGURE 9 is partly true to detail, but is partly only schematic, with details being omitted where they are unnecessary and would be apparent to those skilled in the art in the light of the disclosure herein. Also, of necessity, the drawing is greatly shortened, so that the length of the plungers and the length of stroke of the inverted opposed pumps is exaggeratedly small.

The well apparatus of this FIGURE 9 embodiment is provided with a casing 30$f$ which has perforations 34$f$ and is closed off at the bottom by a plug 43$f$, with the casing 30$f$ extending into the upper porous reservoir layer 20 saturated by the desired lighter liquid to the desired distance above the normal static interface (24, not shown in this figure). Eduction tubing 38$f$ extends axially in the casing 30$f$ from the surface, and is provided at its lower end with working barrel sections 39 and 41 and lower tubular extension 57$f$ mounted by means of threads 81 and provided with an end plug 83. The tubing 38$f$ and extension 57$f$ extend through passages in the upper and lower packers 40$f$ and 42$f$ which divide the well into upper well chamber 44$f$, middle well chamber 46$f$ and lower well chamber 48$f$.

A lower reciprocating injection pump 52$f$ and upper reciprocating ejection pump 54$f$ respectively have reciprocating pump plungers 108 and 126 in working barrel sections 41 and 39, connected by a common power channel 50$f$ which is a rod extending through a packing 80. Packing 80 separates the working barrels 39 and 41 into upper and lower pump chambers A and B for pumps 52$f$ and 54$f$, respectively, and prevents leakage between the chambers A and B around connecting rod 50$f$. The connected upper and lower pump plungers 108 and 126 are operated by a common power input means 55$f$, which is a sucker rod operated by any suitable reciprocating means at the surface.

As in FIGURES 2, and 5–8, the packers 40$f$, 42$f$ and 80 are merely shown diagrammatically since they are not per se a part of the present invention and suitable well packers are commercially available.

The upper part of working barrel 41, below packing 40$f$, is provided with perforations 86 to permit entry into pump chamber B of lighter liquid drawn into middle chamber 46$f$ for circulation in the "closed cell." The tubular extension 57$f$ is also provided with perforations 88 located below packing 42$f$ to inject liquid into the lower well chamber 48$f$ by lower pump 52$f$.

A lower ball type standing valve 82 is provided within the lower tubular extension 57$f$. This valve includes a ball 92 normally urged against a valve seat 94 by a spring 96, with ball and valve spring being confined within a typical standing valve cage 98 which has a plurality of longitudinally extending circumferentially spaced elongated slots 100. As is apparent in FIGURE 9, the valve seat 94 is secured by valve cage 98 against an annular stepped intermediate member 102, in cooperation with tubular extension 57$f$, by threaded connections at 104 and 106. As will be apparent, when the ball 92 engages the valve seat 94 under the action of the spring 96, a flow cannot occur upwardly past the standing valve 82; and when the pressure above the ball 92 is sufficient to unseat it against the pressure of spring 96, this permits a downward flow of liquid past the lower standing valve 82.

It is noted at this point that FIGURE 9 shows the inverted coupled plungers of pumps 52$f$ and 54$f$ near the bottom of their downstroke, whereby the lower standing valve ball 92 is open and spring 96 compressed.

Referring to the lower injection pump 52$f$, this comprises main plunger 108 which is generally tubular and has a lower travelling valve 109 that includes a valve ball 110 adapted to engage valve seat 112 under the action of a valve spring 114, and a valve cage 116 secured to the lower end of plunger 108 by means of threaded connection 118. The valve cage 116 is provided with circumferentially spaced elongate slots 120 to permit flow through the lower travelling valve 109 of liquid passing from axial bore 122 of plunger 108 from a plurality of circumferentially spaced elongate slots 123 in the upper end of pump plunger 108, whereby lighter liquid flows from pump chamber B to and through the lower travelling valve 109. As will be apparent from FIGURE 9, the lower travelling valve ball 110 is adapted to seat on the downstroke of the pump plunger 108, whereby any liquid below the pump plunger 108 is forced downwardly to unseat the lower standing valve ball 92, permitting this liquid to pass into the lower tubular extension 57f and escape therefrom through the perforations 88 into the lower well chamber 48f, whence the liquid is injected into the surrounding upper porous reservoir formation 20.

The upper end of pump plunger 108 is provided with a circular threaded projection 124 which is coupled to the enlarged internally threaded lower end of connecting rod 50f. The plunger member 126 of upper pump 54f is connected at its lower end to the upper end of connecting rod 50f by means of a threaded projection 128 received in an enlarged internally threaded upper end of the connecting rod 50f.

The upper plunger 126 is provided with a plurality of circumferentially spaced elongate slots 129 communicating with central bore 130. The upper end of plunger 126 is provided with an upper travelling valve 131 which includes a valve seat 132, a valve ball 133 (shown in open position), and a valve cage 134 threadedly connected to the upper end of plunger 126 by threads 135. Upper travelling valve cage 134 is provided with circumferentially spaced elongate slots 136 so that liquid can flow from pump chamber A through plunger slots 129 and bore 130 past travelling valve ball 133 into eduction tubing 38f. The upper travelling valve cage 134 is provided with a projection 138 which is threadedly connected to the internally threaded lower enlarged end of sucker rod 55f.

Both plungers 108 and 126 may be provided with any suitable packing means around their periphery, acting against the inside of working barrels 41 and 39, to prevent liquid from flowing around the plungers.

An upper standing ball valve 90, of a kind known in the art (for example, in tandem rod pump installations) extends from the side of working barrel 39, within the upper well chamber 44f. Since standing valve 90 is not per se a feature of the present invention and is known in the art, valve 90 is shown somewhat diagrammatically. Upper standing valve 90 comprises a body 140 which is suitably secured to the side of the lower section of working barrel 39, within upper well chamber 44f and above packer 40f; and has an internal conduit 142 which communicates at one end with the interior of upper pump chamber A and at its other end with a standing ball valve. The ball valve includes a ball 144 that is shown in closed position on valve seat 146, spaced from the valve crown 148 which limits upward travel of valve ball 144, so that liquid may flow from the lower valve inlet 150 around ball 144 when it is displaced from seat 146, into the channel 142 and thence into the chamber A of ejection pump 54f.

Summarizing operation of the FIGURE 9 apparatus: On the upstroke of plungers 108 and 126, the lower standing valve ball 92 is pushed against its valve seat 94 to close lower standing valve 82. At the same time, the ball 110 of lower travelling valve 109 is forced downward away from valve seat 112, thus allowing liquid to pass from pump chamber B through pump plunger 108 past the lower travelling valve 109 into the portion of tubing between lower pump plunger 108 and lower standing valve ball 92. When the direction of motion of sucker rod 55f and pump plungers 108 and 126 is reserved for the downstroke, this liquid between lower standing valve 82 and lower travelling valve 109 closes the travelling valve 109 by forcing ball 110 against its seat 112, and opens the lower standing valve 82 by forcing the ball 92 downward against its spring 96, whereby the liquid formerly drawn into this portion of the tubing passes the standing valve 82 and exits through ports 88 in tubular extension 57f into the lower well chamber 48f, and thence through the perforations 34f in the portion of casing 30f surrounding the well chambers 48f into the surrounding porous stratum 20 which is saturated with lighter liquid. The downstroke of the lower pump plunger 108 also causes lighter liquid to enter the middle well chamber 46f from reservoir formation 20, through surrounding casing perforations 34f, and to then pass through the perforations 86 in working barrel 41 into well chamber B (whence it later passes through the bore 122 of the pump plunger 108, and past the lower travelling valve 109, on the plunger upstroke). As a result, the lower pump 52f causes lighter liquid to be drawn into middle well chamber 46f and then to be injected from the lower well chamber 48f into the porous formation 20, whereby after a period of time the lighter liquid is caused to circulate in a "closed cell" in streamline fashion above the static interface (24, not shown), with typical streamlines 56, 58 and 59 and depressing of the static interface to prevent coning, as disclosed in FIGURE 2 and amplified in the discussion thereof. The upstroke of pump plunger 126 of the upper ejection pump 54f draws lighter liquid through the casing perforations 34f into the upper well chamber 44f, above packer 40f. This liquid descends in the casing 30f to the intake 150 of upper standing valve 90, and then passes through the channel 142 into the upper chamber A within working barrel 39. On the subsequent downward stroke of the sucker rod 55f this lighter liquid in chamber A passes through the upper plunger 126 and past the upper travelling valve 131 into the eduction tubing 38f. Such liquid is thereafter raised upward through the eduction pipe 38f toward the surface on subsequent upstrokes of the pump plunger 126, during which the upper travelling valve 131 is closed.

Figure 9A:
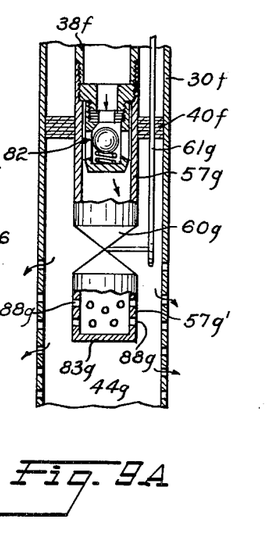
FIGURE 9A is a fragmentary partly diagrammatic vertical cross-section of a modified form of the specific apparatus embodiment disclosed in FIGURE 9, further showing a representative means for throttling the output of the lower reinjection plunger pump to control the relative quantities of lighter reservoir liquid raised to the surface and reinjected into the subterranean reservoir.

Referring to FIGURE 9A, there is shown a fragmentary portion of the well apparatus of FIGURE 9 just described; and the same numerals are used as in FIGURE 9 to identify like parts, with further discussion thereof being unnecessary. This embodiment of FIGURE 9A is modified to the extent that the lower tubular extension indicated by numeral 57g is not perforated as in FIGURE 9, and is connected at its lower end to a throttling valve or choke 60g of a type known in the art. The output end of throttling valve or choke 60g is in turn connected to a further tubular extension 57g' which is provided with an end plug 83g and perforations 88g that permit flow of lighter liquid into the lower well chamber 44g, and thence out into the surrounding porous stratum [20, not indicated], during the downstroke of the lower pump plunger [108, not shown], in like manner as described with reference to FIGURE 9. Since the throttling valve or choke 60g is not per se a part of the present invention and can be of any conventional type known in the art, preferably operable from the surface, by suitable means 61g, it is merely shown schematically in FIGURE 9A. There are various types of bottom hole chokes available for deep wells of the kind here involved, including the so-called "fixed type choke," "adjustable bottom hole choke," and the so-called "replacement type bottom hole choke." The well system of the present invention in FIGURE 9A ordinarily contemplates one of the available "adjustable bottom hole chokes," which are fixed in the sense that they cannot be removed from the well without withdrawing the tubing, but have the advantage that they can be adjusted from the surface to change rate of flow and/or compensate for year, usually by turning the tubing or manipulating rods from the surface (such as indicated at 61g).

Figure 10:
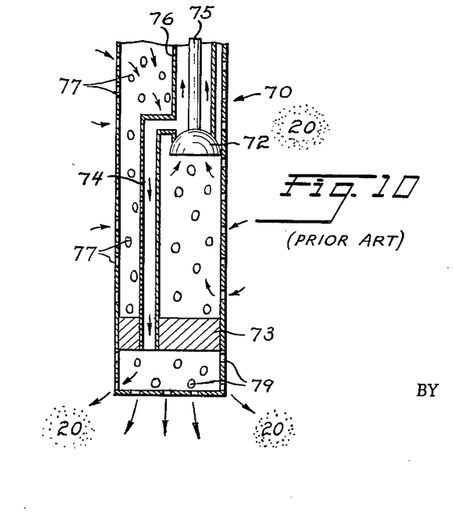
FIGURE 10 is a vertical cross-section diagrammatically showing a well apparatus according to the closest know prior art anti-coning system.

Referring to FIGURE 10 there is schematically shown at 70 the closest known prior art well system for attempting to more or less continuously prevent coning of the underlying water in an oil well. This system comprises a single pump 72 operated from the surface by power input means 75 and a single packing 73, with suitable passage arranged as illustrated. In this well system, the oil pumped into the wall from the upper saturated porous region 20 through an upper region of casing apertures 77 is segregated into two portions. The larger portion of the oil taken into the well 70 is raised to the surface by pump 72 through the eduction pipe 76. Meanwhile, the smaller portion of oil is transmitted through pass means 74 and the opening in the single packing 73, and discharged through lower casing apertures 79 back into the oil-saturated stratum 20 toward the static interface between the oil and underlying water (24, not shown in this figure). After a time, the smaller portion of the lighter liquid thus returned into the upper stratum 20 will recirculate to the pump 72. This recirculated portion of the lighter liquid will in time pick up more and more of the heavier underlying liquid by diffusion and/or dispersion at the interface (24); especially in a water well, wherein the interface is much less stable because of low fluid density contrast and high miscibility of the fluids, whereby fresh water thus recirculated will relatively rapidly pick up a substantial and objectionable amount of chloride ion. Because the system utilizes only one packing 73, below the single pump 72, there is a zone of uncontrolled turbulent mixing around the well 70 above packer 73. It is also likely that the recirculated lighter liquid may be "drowned" by heavier liquid which becomes included or entrained by the flow of recirculated lighter liquid in the region of well intake, in which case there will be substantial contamination of the liquid raised to the sturface. As a result, in such a system, the contaminated recirculated lighter liquid will diffuse and/or disperse into the lighter liquid being drawn into the well by pump 72, thereby ultimately contaminating the liquid pumped to the surface through eduction pipe 76. In a water well, in particular, this contamination can relatively quickly exceed the very small chloride ion tolerances, especially at high rates of production and/or with strong salt water drive found in coastal areas. Thus, the advantages of my new improved methods and apparatuses for circulating a portion of the lighter liquid in a "closed cell" established between the normal static interface (24) and a definite point below the well intake for lighter fluid raised to the surface, with a definite streamline boundary separating the recirculating liquid within the closed cell from the lighter liquid raised to the surface, will be readily apparent.

It will be apparent from the foregoing description that the present invention provides new improved and highly efficient methods and apparatuses for removing a lighter desired liquid from over an underlying undesired heavier liquid in a subterranean reservoir, without mixing or contaminating the lighter liquid with the heavier liquid, and also for continuously preventing coning of the heavier underlying liquid into the porous stratum normally containing the lighter desired liquid; and that my new improved methods and apparatuses of this invention achieve the objects and advantages and improved results set forth earlier in this application, and overcome serious obstacles for the production of uncontaminated lighter liquid from such reservoirs, and eliminate the serious shortcomings of many prior attempts to solve these problems.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of removing a lighter liquid from an underground reservoir formation in which said lighter liquid overlies a heavier, gravity-segregated, less desirable liquid, with a normal static interface between said lighter and heavier liquids, comprising: providing a well which penetrates the reservoir saturated by the lighter liquid; dividing said well into lower intermediate, and main upper chambers, by sealing said well at two spaced locations, the lower of which is near the bottom of the well and above the said static interface; circulating a portion of lighter liquid into said intermediate chamber of the well and thence into said lower well chamber, and injecting said portion of lighter liquid from said lower well chamber downwardly from the well in sufficient quantity to depress the underlying heavier liquid in the region of the well; circulating lighter liquid from the reservoir formation into the main upper chamber of the well and removing such lighter liquid to the surface; said portion of lighter fluid injected downwardly from the well comprising up to about 10% of the volume of lighter fluid removed to the surface.

2. A method of removing a lighter liquid from an underground reservoir formation as defined in claim 1, wherein: a pump is operated in said intermediate well chamber to draw a portion of lighter liquid from the reservoir formation and circulate it through said middle chamber and inject it downwardly and outwardly from the well.

3. A method of removing a lighter liquid from an underground reservoir formation as defined in claim 2, wherein: a second pump is operated in said main upper well chamber to remove said desired lighter liquid from the reservoir formation to the surface.

4. A method of removing a lighter liquid from an underground reservoir formation as defined in claim 1, comprising: the further step of throttling the quantity of the lighter liquid portion circulated through said intermediate and lower well chambers in relation to the quantity of lighter liquid removed from the reservoir formation through said upper main well chamber.

5. A method of removing a lighter liquid from an underground reservoir formation in which said lighter liquid saturates a region of porous stratum overlying a region of porous stratum saturated by a heavier less desirable liquid, with a normal static interface between said heavier and lighter liquids due to gravity segregation, comprising: providing a well which penetrates the reservoir formation to a point above said static interface, with apertures permitting fluid circulation; providing a first packer, having a fluid passage therethrough, near the lower end of said well above said static interface; providing a second packer spaced from and above said first packer, thus dividing said well into at least a main well chamber above said second packer and a second chamber between said packers; circulating a portion of lighter liquid from the stratum into said second chamber between said packers and through said passage in said first packer, thus injecting said portion of lighter liquid into the porous stratum outwardly from the well and downwardly toward said static interface, in sufficient quantity to depress the underlying heavier liquid in the region of the well and establish a cell of circulating lighter liquid above said interface and bounded by streamlines located below the lower end of said main well chamber; and removing lighter liquid to the surface through said main well chamber, from the region of porous stratum saturated therewith which is above and outside of said circulating cell steamlines.

6. A method of removing a lighter liquid from an underground reservoir formation as defined in claim 5, further comprising the step of throttling the quantity of the portion of lighter liquid circulated through said second well chamber and in said cell of lighter liquid in relation to the quantity of lighter liquid removed from the reservoir formation through said main upper well chamber.

7. A method of removing a lighter liquid from an underground reservoir formation as defined in claim 5, wherein: said portion of lighter liquid is circulated through said second chamber between the packers and injected towards the static interface by a pump drawing the lighter liquid from the porous stratum surrounding said second chamber.

8. A method of removing a lighter liquid from an underground reservoir formation as defined in claim 7, wherein: said lighter liquid removed to the surface is drawn into the upper well chamber from the reservoir formation by a second pump in said upper main well chamber.

9. A method of removing fresh water from an underground reservoir formation in which the fresh water saturates a region of porous stratum overlying a region of porous stratum saturated by salt water, with a normal static interface between said fresh water and salt water regions, comprising: providing a well bore with perforated casing which penetrates the porous reservoir formation to a point above said static interface; providing first packing means having a fluid passage therethrough, near the lower end of said well casing and above said static interface, and providing second packing means spaced from and above said first packing means, thus dividing said well casing into an upper main well chamber above said second packing means, an intermediate well chamber between said packing means, and a lower well chamber below said second packing means; pumping a portion of fresh water from the surrounding porous reservoir formation into the intermediate chamber between said packing means and through said passage in the lower first packaging means to the lower well chamber and thence outwardly from the well and downwardly towards said static interface in sufficient quantity to depress the underlying salt water in the region of the well and establish a cell of circulating fresh water above said interface and bounded by streamlines located between the lower end of said main well chamber and said interface; and pumping fresh water into the main upper chamber of the well from the fresh water-saturated porous stratum above and outside of said circulating streamlines, and to the surface.

10. A method of removing oil from an underground reservoir formation in which said oil saturates a region of porous stratum overlying a region of porous stratum saturated with water, with a normal static interface between said oil and water, comprising: providing a well bore with perforated casing which penetrates the porous reservoir formation to a point above said oil-water static interface; providing a first packing, having a fluid passage therethrough, near the lower end of said well casing and above said static interface, and providing a second packing spaced from and above said first packing, thus dividing said well bore into an upper main well chamber above said second packing, an intermediate well chamber between said packings, and a lower well chamber below said second packing; pumping a portion of oil into said intermediate chamber between said packings and through said passage in said first packing and into said lower well chamber, and injecting said portion of oil into the porous oil-saturated stratum outwardly from the well and downwardly towards said oil-water static interface, in sufficient quantity to depress the underlying water in the region of the well bore and to establish a cell of circulating oil above said static interface which is bounded by stream lines located below the lower end of said main well chamber and said static interface; and removing oil to the surface through said main well chamber from the porous oil-saturated stratum above and outside streamlines of the circulating oil cell.

11. An apparatus for removing a lighter liquid from an underground reservoir formation in which said lighter liquid saturates a region of porous stratum overlying a region of porous stratum saturated by a heavier less desirable liquid, with a normal static interface between the lighter and heavier liquids, comprising: a well casing which penetrates the reservoir formation stratum saturated with lighter liquid; a first packer having a fluid passage therethrough in said casing near its lower end and above said static interface; a second packer in said casing spaced from and above said first packer, said packers dividing the well casing into at least a main well chamber above said second packer and a second well chamber between said packers; part of said casing surrounding said two chambers being perforated to permit flow of lighter liquid into the well casing from the surrounding porous stratum; pump means in said well casing for drawing a portion of lighter liquid into said second well chamber from the surrounding porous stratum and circulating it through said first packer passage and into the porous stratum, outwardly from the well and downwardly; and means for removing to the surface lighter liquid passing from the porous stratum into said main well chamber above said second packer.

12. An apparatus for removing a lighter liquid from an underground reservoir formation as defined in claim 11, wherein: said pump is longitudinally disposed in said second well casing chamber between said first and second packers.

13. An apparatus for removing a lighter liquid from an underground reservoir formation as defined in claim 11, wherein: the lower part of said perforated well casing extends below said first packer and terminates above said static interface, thus providing in fluid communication with said second well chamber a third lower well chamber through which said portion of lighter liquid is circulated downwardly towards said static interface.

14. An apparatus for removing a lighter liquid from an underground reservoir formation as defined in claim 13, further comprising: throttling means for controlling the quantity of lighter liquid circulated by said pump through said second and lower chambers in relation to the quantity of lighter liquid removed from the reservoir formation through said upper main well chamber.

15. An appraatus for removing a lighter liquid from an underground reservoir formation as defined in claim 13, wherein: said pump means is longitudinally disposed between said first and second packers defining said second well chamber, said last-recited means for removing said lighter liquid to the surface comprises a second pump disposed above said second packer in said upper main well chamber, and said two pump means are reciprocating plunger pumps in opposed relation connected by a common power channel and driven by common power input means including a reciprocable rod connected to said second pump; said first recited pump means having its input in fluid communication with said second well chamber and its output in fluid communication with said lower well chamber, and said second pump means having its inlet in fluid communication with said upper main well chamber and its outlet connected to eduction piping through which the lighter liquid is raised to the surface.

16. An apparatus for removing a lighter liquid from an underground reservoir formation as defined in claim 11, wherein: said means for removing said lighter liquid to the surface comprises a second pump disposed in said upper main well chamber above said second packer.

17. An apparatus for removing a lighter liquid from an underground reservoir formation as defined in claim 16, wherein: said second packer has a liquid passage therethrough substantially concentric with said passage in said first packer, and said two pump means are in opposed relation and connected by a common power channel so that they are drivable by common power input means, and further comprising: a conduit connecting the outlet of the first-mentioned pump with the passage of said first packer; a surrounding conduit connected between said passage in said second packer and the first-mentioned pump in such manner that the spacing between said conduits provides a passageway for lighter liquid drawn into said second well chamber between said packers; and eduction piping connected to the outlet of said second-mentioned pump in said main well chamber, for raising of lighter liquid to the surface.

18. An apparatus for removing a lighter liquid from an underground reservoir formation as defined in claim 16, wherein: said second packer has a pair of passages extending therethrough, one of them being substantially in alignment with said passage in said first packer, and said pump means are in tandem relationship and connected by a common power channel so that they are drivable by a common power input means, and further comprising: conduit means connecting the outlet of said first-recited pump and said aligned passages in said first and second packers; additional conduit means connecting the inlet of said first-recited pump with the other passage in said second packing; and conduit means connected to the outlet of said second-recited pump means for raising the lighter liquid to the surface.

19. An apparatus for removing a lighter liquid from an underground reservoir formation as defined in claim 16, wherein: said two pump means are in opposed relation and connected by a common power channel and driven by common power input means; with the outlet of the first-recited pump means being connected by conduit means to the passage in said first packer, and the outlet of the second-recited pump means being connected to eduction piping through which the lighter liquid is raised to the surface.

20. An apparatus for removing a lighter liquid from an underground reservoir formation as defined in claim 19, wherein: said first-recited pump means is longitudinally disposed in said second casing chamber between said first and second packers, and said second-recited pump means is located in said main well casing chamber near said second packer, whereby the opposed pump means are closely spaced.

21. An apparatus for removing a lighter liquid from an underground reservoir as defined in claim 19, wherein: said first-recited pump means is disposed within said second well casing chamber between said first and second packers, and said second-recited pump means is located in said upper well casing chamber a substantial distance from said second packer, whereby the opposed pump means are spaced relatively far apart.

22. A well apparatus comprising: a well casing adapted to penetrate a subterranean reservoir formation which is saturated with desired liquid; a first packer having at least one passage therethrough in said casing near its lower end, a second packer having at least one passage therethrough in said casing spaced from and above said first packer, said packers dividing said well casing into a first upper main well chamber above said second packer, a middle well chamber between said first and second packers, and a third lower well chamber below said first packer; at least part of the casing portions surrounding each of said three chambers being perforated to permit flow of liquid between the surrounding reservoir formation and said three well chambers; a conduit extending longitudinally within said casing and through said packers, including working barrel portions; a pair of reciprocable pump plungers coupled by connecting means and disposed in said working barrel portions with packing means within said conduit surrounding said connecting means and separating said working barrels thus forming an upper pump chamber below the upper one of said coupled pump plungers and a lower pump chamber above the lower one of said coupled pump plungers; the portion of said longitudinally extending conduit surrounding said lower pump chamber being perforated to permit liquid to flow into said lower pump chamber; said lower pump plunger having adjacent its lower end a travelling valve which is adapted to close on the downstroke of said lower plunger and open on its upstroke, with said valve being in fluid communication with said lower pump chamber; said upper pump plunger having at its upper end a travelling valve adapted to close on the upstroke and open on the downstroke of said upper plunger, with said valve being in fluid communication with said upper pump chamber and also in fluid communication with part of said longitudinally extending conduit which extends upward for eduction of liquid to the surface when the well apparatus is installed in a subterranean reservoir formation; means connected to the upper one of said coupled pump plungers for reciprocating said plungers from the surface; a standing valve supported by said longitudinally extending conduit below said first mentioned travelling valve on the lower pump plunger, with the outlet of said standing valve in fluid communication with said third lower well chamber, said standing valve being adapted to open on the downstroke of said lower pump plunger and close on its upstroke; another standing valve supported by said longitudinally extending conduit within said first well chamber above said second packer, with the inlet of said standing valve in fluid communication with said upper pump chamber, said standing valve being adapted to close on the downstroke of said upper pump plunger and open on its upstroke.

23. A well apparatus as defined in claim 22, wherein each of said standing valves is of the ball type.

24. A well apparatus as defined in claim 23, wherein said first-mentioned standing valve and first-mentioned travelling valve each include a spring which normally urges the valve ball upward against the seat of the valve.

25. A well apparatus as defined in claim 22, further comprising: throttling means supported by said longitudinally extending conduit and located below said first-mentioned standing valve, said first-mentioned standing valve being in fluid communication with said lower well chamber through said throttling means.

26. A well apparatus as defined in claim 25, further comprising: means for operating said throttling means from the surface when the well apparatus is installed in a subterranean reservoir formation, so that it is possible to adjust from the surface the quantity of liquid pumped into the lower well chamber by said lower pump plunger compared to the quantity of liquid lifted to the surface through said eduction conduit by said upper pump plunger.

27. A well apparatus adapted for use in a well casing penetrating a subterranean reservoir formation which is saturated with desired liquid comprising: a first packer having at least one passage therethrough adapted to be set in the well casing near its lower end, and a second packer having at least one passage therethrough adapted to be set in the well casing spaced from and above said first packer, whereby said packers will divide the well casing into at least a first upper main well chamber above said second packer, and a middle well chamber between said first and second packers; said packers being supported by a conduit adapted to extend longitudinally within the well casing, said conduit extending through said packers and including working barrel portions; a pair of reciprocable pump plungers coupled by connecting means and disposed in said working barrel portions, with packing means within said conduit surrounding said connecting means and separating said working barrels thus forming an upper pump chamber below the upper one of said coupled pump plungers and a lower pump chamber above the lower one of said coupled pump plungers, the portion of said longitudinally extending conduit surrounding said lower pump chamber being perforated to permit liquid to flow into said lower pump chamber; said lower pump plunger having adjacent its lower end a travelling valve which is adapted to close on the downstroke of said lower plunger and open on its upstroke, with said valve being in fluid communication with said lower pump chamber; said upper pump plunger having at its upper end a travelling valve adapted to close on the upstroke and open on the downstroke of said upper plunger, with said valve being in fluid communication with said upper pump chamber and also in fluid communication with part of said conduit which is adapted to extend upward in the well casing for eduction of liquid to the surface when the apparatus is installed in a well in a subterranean reservoir formation; a standing valve supported by said conduit below said first-mentioned travelling valve on the lower pump plunger, with the outlet of said standing valve in fluid communication with part of the well below said first packer, said standing valve being adapted to open on the downstroke of said lower pump plunger and close on its upstroke; another standing valve supported by said conduit above said second packer, with the inlet of said standing valve in fluid communication with said upper pump chamber, said standing valve being adapted to close on the downstroke of said upper pump plunger and open on its upstroke.

28. A well apparatus as defined in claim 27, further comprising: throttling means supported by said conduit and located below said first-mentioned standing valve, said first-mentioned standing valve being in fluid communication with the outlet of said throttling means.

29. A well apparatus as defined in claim 28, further comprising: means for operating said throttling means from the surface when the apparatus is installed in a well in a subterranean reservoir formation, so that it is possible to adjust from the surface the quantity of liquid pumped downward by said lower pump plunger compared to the quantity of liquid lifted to the surface through said eduction part of the conduit by said upper pump plunger.

References Cited by the Examiner

UNITED STATES PATENTS

| | | | |
|---|---|---|---|
| 2,281,801 | 5/42 | Reynolds et al. | 166—42 |
| 2,607,426 | 8/52 | Rose | 166—45 |
| 2,886,108 | 5/59 | Piety | 166—106 X |

FOREIGN PATENTS 1,109,092  9/55  France.

CHARLES E. O'CONNELL, *Primary Examiner.*

UNITED STATES PATENT OFFICE
CERTIFICATE OF CORRECTION

Patent No. 3,199,592                                               August 10, 1965

Charles E. Jacob

It is hereby certified that error appears in the above numbered patent requiring correction and that the said Letters Patent should read as corrected below.

Column 1, line 46, for "fluid" read -- liquid --; column 3, line 6, after "said" insert -- oil --; column 5, line 36, for "know" read -- known --; column 6, line 28, for "usuable" read -- unusable --; column 9, line 59, for "cll" read -- cell --; column 12, line 40, for "bleow" read -- below --; column 13, line 73, for "119" read -- 110 --; column 14, line 31, for "liqhter" read -- lighter --; line 69, for "year" read -- wear --; column 15, line 4, for "wall" read -- well --; line 31, for "sturface" read -- surface --; column 16, line 5, after "lower" insert a comma; lines 64 and 65, for "steamlines" read -- streamlines --; column 17, line 30, for "packaging" read -- packing --; line 63, for "stream lines" read -- streamlines --; column 18, line 37, for "appraatus" read -- apparatus --.

Signed and sealed this 26th day of April 1966.

(SEAL)
Attest:

ERNEST W. SWIDER                                EDWARD J. BRENNER
Attesting Officer                                Commissioner of Patents